United States Patent [19]
Garetz et al.

[11] Patent Number: 5,696,930
[45] Date of Patent: Dec. 9, 1997

[54] CAM ACCELERATED BUFFER MANAGEMENT

[75] Inventors: Mark Garetz, Danville, Calif.; David Skinner, Boulder, Colo.

[73] Assignee: Advanced Micro Devices, Inc., Sunnyvale, Calif.

[21] Appl. No.: 597,369

[22] Filed: Feb. 9, 1996

[51] Int. Cl.⁶ .................................................... G06F 13/00
[52] U.S. Cl. .................. 395/435; 395/481; 395/823; 395/825; 395/421.02; 395/421.1; 395/421.04; 395/412; 364/DIG. 1
[58] Field of Search ................................. 395/435, 412, 395/421.02, 421.1, 421.04, 481, 823, 825

[56] References Cited

U.S. PATENT DOCUMENTS

| | | | |
|---|---|---|---|
| 4,149,239 | 4/1979 | Jenkins et al. | 395/435 |
| 4,758,982 | 7/1988 | Price | 395/435 |
| 5,317,708 | 5/1994 | Edgar | 395/435 |
| 5,428,759 | 6/1995 | Smith et al. | 395/435 |
| 5,440,709 | 8/1995 | Edgar | 395/435 |
| 5,537,623 | 7/1996 | Chamberlain et al. | 395/435 |

FOREIGN PATENT DOCUMENTS 0522728  1/1993  European Pat. Off. .

OTHER PUBLICATIONS

IBM Technical Disclosure Bulletin, vol. 31, No. 10 Mar. 1989, pp. 92–93.

*Primary Examiner*—Frank J. Asta
*Attorney, Agent, or Firm*—Davis Chin

[57] ABSTRACT

A method and apparatus for managing effectively data and command buffers in an I/O subsystem utilizes a content addressable memory (CAM) array (36) having a plurality of CAM storage locations (SL1 ... SLn). The CAM array is used to store a plurality of SCSI Nexus entries and generates a unique address pointer when there is a match between an incoming SCSI Nexus value and one of the plurality of SCSI Nexus entries. A command buffer (24) or user data buffer (26) is responsive to the unique address pointer for storing and retrieving the command/data section of a Command Control Block in a corresponding one of a plurality of buffer storage locations. As a result, the host CPU (12) or adapter (22) is relieved of much of the overhead associated with managing these buffers.

8 Claims, 2 Drawing Sheets

CAM ACCELERATED BUFFER MANAGEMENT

BACKGROUND OF THE INVENTION

1. Field of the Invention

This invention relates generally to buffer or memory management systems and more particularly, it relates to a buffer management accelerator utilizing a content addressable memory (CAM) for managing data and command buffers in an intelligent I/O subsystem in a more efficient and effective manner than has been traditionally available.

2. Description of the Prior Art

In the prior art of an intelligent I/O (input/output) subsystem, it is generally known that a local central processing unit (CPU) or adapter is used to communicate with a host CPU via a bus. The local CPU or adapter receives high-level commands from the host CPU, manages the execution of these commands, and controls all of the data transfer to and from the I/O subsystem and the host CPU. As a result, the local CPU in the I/O subsystem is typically required to perform the functions of decoding the system I/O commands, breaking these commands down into card or chip level register read and write commands, and maintaining tabs on the progress of the I/O command execution. Further, the local CPU is required to perform the function of handling of the system I/O commands in parallel by queuing them up to be executed.

Accordingly, there is provided in the intelligent I/O subsystem queue buffers which are allocated in a local (temporary) memory, then subsequently searched, and then de-allocated as progress is made. However, in the case of SCSI (an acronym for small computer system interface), the task of handling these various commands becomes even more complicated due to the fact that the commands can be arbitrarily interrupted or suspended and then resumed at a later time. Thus, it will be noted that the overhead associated with the management of these queues takes a significant portion of the bandwidth of the local CPU. As a consequence, the I/O performance may suffer when the local CPU does not have sufficient power. While it is possible to use a new higher performance CPU, this has the disadvantage of being more costly and requiring of firmware to be rewritten for the new CPU.

Alternatively, if special purpose hardware could be developed so as to assist in the buffer management process, then there could still be realized a high level of I/O performance with the lower performance CPU. On the other hand, a high performance CPU could be used in association with the specialized hardware so as to achieve an even higher I/O performance than could be attained with the high performance CPU being operated alone.

One of the many problems generally encountered with queuing commands and their associated data is managing of the buffers. This problem arises from the desire to fill the buffers in an efficient manner. In operation, if all of the commands were executed in the order that they were received and each were completed before the next command was processed, the solution to managing of the buffers could be effected by simply providing FIFO hardware registers or counters to perform the task. However, as previously stated, in the case of SCSI a problem exists where the first command may be sent to a SCSI device and then the SCSI device is disconnected so as to free up the SCSI bus for other traffic. As a result, the first command will be suspended or interrupted prior to its completion and another or second I/O command will be processed. Therefore, the start of each command may be executed in the order in which they were received; however, the completion of that particular command may not be executed in the same order.

In order to solve this latter problem, there is required the necessity of a series of I/O descriptors which must be stored in a command buffer or queue and has the capability of retrieving quickly an I/O command that was previously put on hold (i.e., execution of the command was not completed). Consequently, when the commands are completed, the associated I/O descriptors are removed which leave empty spaces or holes in the buffer. Thus, it is typically desired to fill the empty spaces with new commands in an efficient and effective manner. Commonly, the local CPU must perform the function of either repacking the list of commands each time an entry is to be added or to be deleted, or tagging the list of commands with a marker which is updated each time a command is to be added or deleted. With this technique being implemented, all of the markers must be searched each time a command is required to be activated or re-activated, thereby causing many cycles of the CPU to be consumed. Moreover, the CPU must constantly perform the function of updating the markers.

As is also generally known in the field of SCSI, the host CPU issues high-level commands to the local CPU or adapter located on the intelligent I/O subsystem via the control/data bus in the form of a SCSI Command Control Block (CCB). Each SCSI CCB is comprised of 64 bytes in which three (3) bytes thereof are defined to be a SCSI Nexus, each byte formed of 8 bits. Thus, the SCSI Nexus consists of unique combinations of a 24-bit quantity which contain the fields ID (device identification), LUN (logic unit number), and QT (queue tag), each field being formed of an 8-bit quantity. The SCSI Nexus is defined to be unique for each active command.

One prior art way of allocating of storage for each SCSI Nexus is to store the information associated with the Command Control Block (CCB) at the unique "address" of the SCSI Nexus. However, this approach suffers from the disadvantage of requiring a large amount of storage since there are literally millions and millions of possible combinations for the 24-bit SCSI Nexus values wherein each of the combinations requires separate buffer (storage) space. Moreover, most of the storage required would be wasted since only a relatively small percentage of all of the possible combinations (addresses) would be generated by the host CPU at any given time. In other words, the number of SCSI Command Control Blocks generated by the host CPU would be generally limited to a relatively small quantity but yet the amount of storage space that would be needed to be pre-allocated would be massive.

Another prior art approach of allocating of storage for each 24-bit SCSI Nexus is to reduce or "hash" the SCSI Nexus into a smaller bit pattern. Then, this smaller value could be used as a pointer to storage locations. While this method of using a hashing algorithm reduces the storage requirements, there is caused still another problem because such hashing algorithm may generate duplicate pointers. In order to insure that duplicate pointers are not created, there would be required additional overhead which becomes excessive.

Accordingly, it would be desirable to provide an improved buffer management system device which eliminates the problems of the prior art devices described above. The present invention is directed to a buffer management device which incorporates the use of a content addressable memory (CAM) for managing efficiently data and command buffers so as to produce a significant improved performance level which is achieved by only a limited amount of increase in the hardware.

SUMMARY OF THE INVENTION

Accordingly, it is a general object of the present invention to provide a buffer management accelerator for managing data and command buffers in a more efficient and effective manner than has been traditionally available.

It is an object of the present invention to provide an improved buffer management device which can be implemented by using a lower costing CPU without sacrificing performance.

It is another object of the present invention to provide an improved buffer management device which eliminates the problems of large, scarcely used storage buffers.

It is still another object of the present invention to provide a method and apparatus for managing efficiently data and command buffers which avoids the problem encountered in hashing algorithms that may generate duplicate pointers.

In a preferred embodiment of the present invention, there is provided a method and apparatus for managing efficiently data and command buffers in an I/O subsystem which includes a host central processing unit for generating high-level commands in the form of a Command Control Block having a first portion defined by a command/data section and a second portion thereof defined as an incoming SCSI Nexus value. A local processing unit is provided which is responsive to the Command Control Block for separating the SCSI Nexus value from the Command Control Block. A content addressable memory (CAM) array having a plurality of CAM storage locations is used to store a plurality of SCSI Nexus entries and generates a unique address pointer when there is a match between the SCSI Nexus value and one of the plurality of SCSI Nexus entries. A command buffer having a plurality of buffer storage locations is responsive to the unique address pointer for storing and retrieving the command/data section of the Command Control Block in a corresponding one of the plurality of buffer storage locations.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
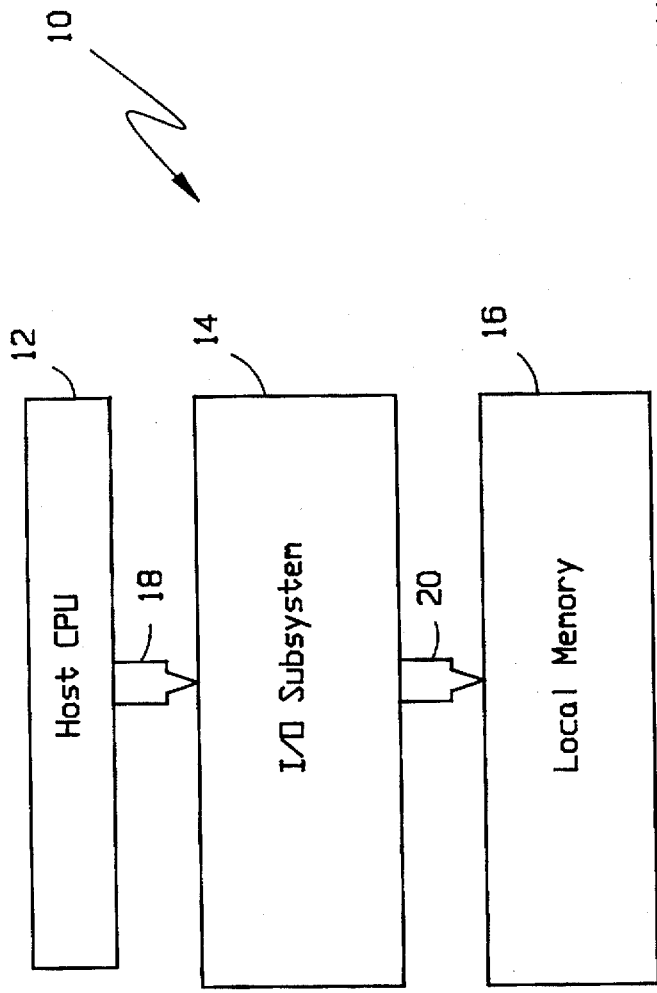
FIG. 1 is an overall block diagram of a data processing system employing the present invention.

Referring now in detail to the drawings, there is shown in FIG. 1 an overall block diagram of a data processing system 10 which employs the present invention and is comprised of a host central processing unit 12 (CPU), an intelligent I/O (input/output) subsystem 14, and a real (local) memory 16. The I/O subsystem 14 provides an interface between the host CPU 12 and the local memory 16. A computer program running in the CPU 12 issues via bus 18 high-level commands in the form of SCSI Command Control Blocks (CCB) to a chip/adapter or local CPU located within the I/O subsystem 14. Also, there is contained within the I/O subsystem a buffer management device of the present invention which manages command buffers and data buffers located in the local memory 16 via a bus 20.

Figure 3:
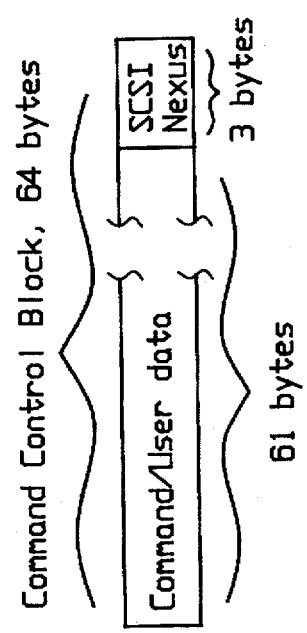
FIG. 3 illustrates the format of a Control Command Block.
Figure 2:
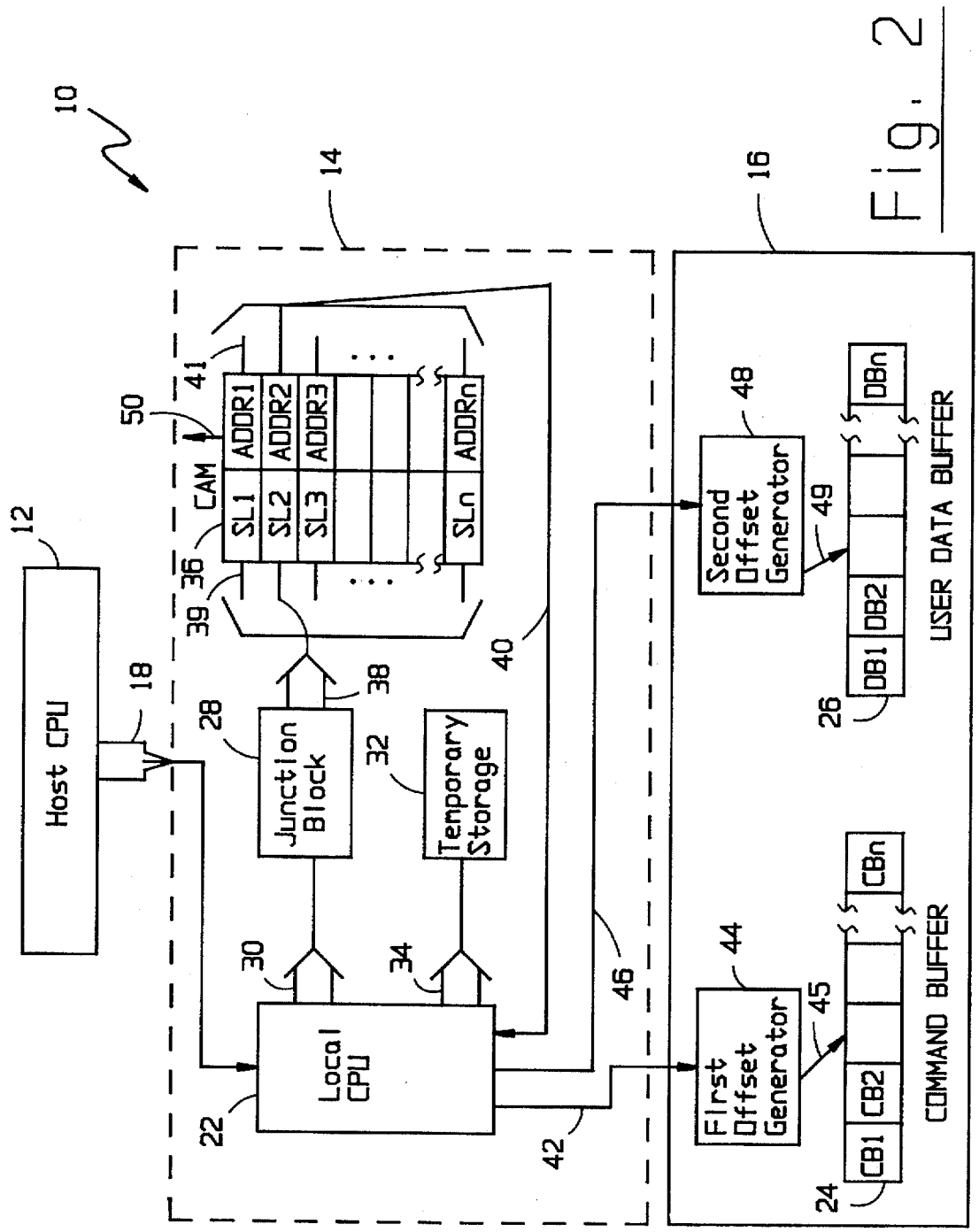
FIG. 2 is a detailed block diagram of the I/O subsystem of FIG. 1, illustrating the buffer management device which is constructed in accordance with the principles of the present invention.

In FIG. 2, there is illustrated a detailed block diagram of the I/O subsystem 14 containing the buffer management device, which is constructed in accordance with the principles of the present invention. The host CPU 12 issues the CCB via the bus 18 to the local CPU 22 within the I/O subsystem 14. The CCB is to be stored in either the Command Buffer 24 or the User Data Buffer 26 which are part of the storage space located in the local memory 16. The Command Control Block is comprised of a 64-byte quantity whose format is depicted in FIG. 3. The Control Command Block consists of (1) first portion having 61 bytes of information (command or user data), and (2) a second portion consisting of 3 bytes of a SCSI Nexus value, which is a unique combination of 24 bits.

Figure 4:
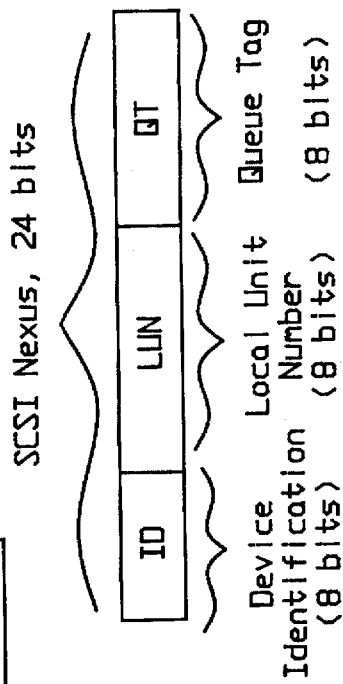
FIG. 4 illustrates the format of a SCSI Nexus.

The SCSI Nexus quantity is formed of 3 eight-bit fields whose format is illustrated in FIG. 4. A first 8-bit field is ID which represents the device identification; a second 8-bit field is LUN which represents the logic unit number; and a third 8-bit field is QT which represents the queue tag. These three fields forming the SCSI Nexus are defined to be unique for each of the Command Control Blocks.

As can be seen from FIG. 2, the local CPU 24 routes the CCB as two separate parts. The local CPU extracts the 3-byte SCSI Nexus quantity from the CCB and transfers the same to a junction block 28 via line 30. The remainder of the CCB is transferred by the local CPU 22 as a 61-byte quantity to a temporary storage unit 32 via line 34. The junction block 28 then routes the SCSI Nexus therein to a content addressable memory (CAM) array 36 via line 38.

As is generally known to those skilled in the art, the content addressable memory (CAM) array 36 is an associative memory device which has a function contrary to that of a conventional memory in that storage locations within the CAM array are addressable simultaneously and in parallel by data (an incoming bit pattern) applied thereto so as to determine whether or not the same data is stored therein. When the result of the comparison proves that the specified incoming bit pattern is stored within the CAM array, an output signal representative of the address of the data is generated which is utilized for further data processing purposes. Therefore, it can be seen that the CAM array may be utilized effectively for the execution of data retrieval and sorting at a very high speed since such process can be achieved directly by the hardware.

The inventor of the present invention has discovered that an improved buffer management device and method can be implemented for managing data and command buffers in an efficient and effective manner through the use of a CAM array. In the disclosed embodiment, the CAM array 36 is preferably a content addressable memory having one hundred storage locations SL1, SL2, ... SLn. It is important to note that the CAM array 36 contains sufficient number of storage locations so as to store all of the number of possible SCSI Nexus values generated by the host computer 12. Thus, it can be seen that the CAM array 36 may have more or fewer storage locations in another embodiment. Further, each of the storage locations SL1 through SLn is required to contain sufficient bit positions in order to store the SCSI Nexus value (i.e., 24-bit positions in the present case). Therefore, the CAM array 36 is suitably comprised of a 100-word construction with each word having 24 bits each.

It is the function of the CAM array 36 to compare the 24-bit quantity of the SCSI Nexus received from the junction block 28 via the line 38 against the 24-bit quantities (SCSI Nexus entries or words) stored in each of the respective 100 storage locations SL1 through SLn. If an exact match is detected to exist between the SCSI Nexus received via the line 38 and the 24-bit quantity stored in any one of the 100 storage locations within the CAM array, one of the associated addresses ADDR1, ADDR2, ... ADDRn will be generated which corresponds to the storage location within the CAM array of the 24-bit SCSI Nexus for which the match was received. It will be noted that each of the SCSI Nexus entries has its own word line 39 and that each of the associated addresses has its own match line 41.

For example, assuming that there is a match between the incoming SCSI Nexus value and the 24-bit quantity (SCSI Nexus entry) stored in the storage location SL2, a corresponding address ADDR2 will be generated. This address ADDR2 will be, for instance, sent via line 40 to the local CPU 22. The local CPU uses this address as a pointer which is fed via line 42 to the input of a first offset generator 44. The offset generator 44 is quite conventional and is used for generating an offset to the bits of the address ADDR2 so as to shift its bits. The output of the first offset generator 44 is used to access via line 45 the corresponding one of 100 buffer storage locations CB1, CB2, ... CBn within the Command Buffer 26 for storing and retrieving the associated command/data section of the SCSI CCB. The Command Buffer 24 is a random access semiconductor memory containing 100 storage locations of, for example, 61 bytes within this disclosed embodiment. It should be clearly understood that more or fewer storage locations may be used in another embodiment, as long as there is one-to-one correspondence between the buffer storage locations CB1 through CBn within the Command Buffer 24 and the CAM storage location SL1 through SLn within the CAM array 36.

In this example, the same address ADDR2 can also be sent via line 46 to the input of a second offset generator 48. The second offset generator 48 is identical in function to the first offset generator 44. The output of the offset generator 48 is used to access via line 49 the corresponding one of 100 buffer storage locations DB1, DB2 ... DBn within the User Data Buffer 26 for storing and retrieving the possible user data depending upon the SCSI CCB. The User Data Buffer 26 is also a random access semiconductor memory containing 100 storage locations of 61 bytes within this disclosed embodiment. Similarly, there is required again one-to-one correspondence between the storage locations DB1 through DBn within the User Data Buffer 26 and the CAM storage location within the CAM array 36.

In operation, each time the host CPU 12 first issues a CCB, the SCSI Nexus value associated with the CCB will be stored or written into one of the storage locations SL1 through SLn as a SCSI Nexus entry in the CAM array 36 and an address pointer will be sent via the line 40 to the local CPU 22, with no possibility of duplicate address pointers being created. At any time thereafter, the local CPU needs to retrieve the CCB (command or user data portion) it will simply issue the appropriate SCSI Nexus value to the CAM array 36 and the address pointer will be returned in one processing cycle which is used to access the storage locations in the Command Buffer or User Data Buffer where the corresponding command/data section of the CCB is stored.

It should be appreciated by those skilled in the art that each time the host CPU 12 first issues a new Command Control Block (CCB) the SCSI Nexus value associated with the CCB will be initially assigned at a fast speed to a particular buffer location within either the Command Buffer 24 or User Data Buffer 26 by the CAM array 36. Unlike the prior art technique which uses software-only implementations, the present invention takes advantage of the CAM array's ability to automatically de-allocate storage locations in the buffers so that the same may be reused immediately. As a result, the CAM array relieves the host CPU and/or the local CPU of managing, allocating, and de-allocating of the storage locations in the buffers.

Further, hardware integral to the CAM array 36 provides an empty/full status indicator via line 50 to the local CPU 22 which notifies it as a "buffer full" state. The CAM array 36 also includes hardware which handles assigning SCSI Nexus entries to the empty CAM storage locations, thereby reducing significantly the number of CPU processing cycles and providing automatically packing of the storage locations in the Command Buffer 24 and the User Data Buffer 26.

The buffer management device of the present invention has the following advantages over the prior art devices:

(a) It can be implemented by using a lower costing local CPU without sacrificing performance or using a high power CPU with specialized hardware so as to achieve an even higher I/O performance not possible with the CPU alone;

(b) It eliminates the problem of large, sparsely used storage buffers; and (c) It avoids the problem encountered in having hashing algorithms which may generate duplicate pointers.

From the foregoing detailed description, it can thus be seen that the present invention provides an improved buffer management device for managing data and command buffers in an intelligent I/O subsystem in a more efficient and effective manner. This is achieved through the use of a content addressable memory (CAM) array for storing a plurality of SCSI Nexus entries and for generating a unique address pointer when there is a match between an incoming SCSI Nexus value and one of the plurality of SCSI Nexus entries.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. In a data processing system for efficiently managing command and data buffers comprising in combination:

host central processing means (12) for generating high-level commands in the form of a Command Control Block having a first portion defined by a command/data section and a second portion thereof defined as an incoming SCSI Nexus value;

local processing means (22) responsive to said Command Control Block for separating said SCSI Nexus value from said Command Control Block;

CAM array means (36) having a plurality of CAM storage locations (SL . . . SLn) for storing a plurality of SCSI Nexus entries and for generating unique CAM addresses when there is a match between said SCSI Nexus value and one of the said plurality of SCSI Nexus entries;

said local processing means responsive to said unique CAM addresses for generating first and second address pointers;

first offset generator means (44) responsive to said first address pointer for generating a first offset which is used to access command buffer means;

second offset generator means (48) responsive to said second address pointer for generating a second offset which is used to access user data buffer means;

command buffer means (24) having a plurality of first buffer storage locations (CB1 . . . CBn) and being responsive to said first offset for storing and retrieving the command/data section of the Command Control Block in a corresponding one of said plurality of first buffer storage locations and user data buffer means (26) having a plurality of second buffer storage locations (DB1 . . . DBn) and being responsive to said second offset for storing and retrieving the command/data section of the Command Control Block in a corresponding one of said plurality of second buffer storage locations.

2. In a data processing system as claimed in claim 1, wherein said SCSI Nexus is defined by a unique combination of 24 bits which is unique for each active Command Control Block.

3. In a data processing system as claimed in claim 2, wherein said CAM array means is comprised of a content addressable memory which is constructed of 100 words with each word having 24 bits each.

4. In a data processing system as claimed in claim 3, wherein said command buffer is a random access semiconductor memory containing 100 storage locations so as to form a one-to-one correspondence with said CAM storage locations.

5. In a data processing system as claimed in claim 4, wherein said user data buffer means is a random access semiconductor memory containing 100 storage locations so as to form a one-to-one correspondence with said CAM storage locations.

6. In a data processing system as claimed in claim 1, wherein said CAM array means is responsive to a new Command Control Block issued each time by said host central processing means so as to initially assign at a fast speed the SCSI Nexus value associated with the new Command Control Block to one of the plurality of buffer locations in said command buffer means.

7. A method for managing effectively data and command buffers in an I/O subsystem comprising the steps of:

generating high-level commands in the form of a Command Control Block having a first portion defined by a command/data section and a second portion thereof defined as an incoming SCSI Nexus value;

separating said SCSI Nexus value from said Command Control Block;

storing in a CAM array having a plurality of CAM storage locations a plurality of SCSI Nexus entries;

generating unique CAM addresses when there is a match between said SCSI Nexus value and one of said plurality of SCSI Nexus entries;

generating first and second address pointers in response to said unique CAM addresses;

storing and retrieving from a command buffer having a plurality of first buffer storage locations the command/data section of the Command Control Block in a corresponding one of the plurality of first buffer storage locations in response to said first address pointer; and storing and retrieving from a user data buffer having a plurality of second buffer storage locations the command/data section of the Command Control Block in a corresponding one of the plurality of second buffer storage locations in response to said second address pointer.

8. A method as claimed in claim 7, further comprising the step of assigning initially at a fast speed the SCSI Nexus value associated with a new Command Control Block to one of the plurality of buffer locations in the command buffer.

* * * * *